United States Patent
Kitamura et al.

(10) Patent No.: US 10,479,691 B2
(45) Date of Patent: Nov. 19, 2019

(54) METHOD FOR RECOVERING SILICA FROM SILICA-CONTAINING PLANT BODY USING TITANIUM OXIDE

(71) Applicant: Rapas Corporation, Shiga (JP)

(72) Inventors: Keiko Kitamura, Shiga (JP); Itsushi Kashimoto, Shiga (JP); Masahiro Nishimura, Shiga (JP)

(73) Assignee: Rapas Corporation, Shiga (JP)

( * ) Notice: Subject to any disclaimer, the term of this patent is extended or adjusted under 35 U.S.C. 154(b) by 0 days.

(21) Appl. No.: 15/306,765

(22) PCT Filed: Mar. 31, 2015

(86) PCT No.: PCT/JP2015/060289
§ 371 (c)(1),
(2) Date: Jan. 3, 2017

(87) PCT Pub. No.: WO2015/152315
PCT Pub. Date: Oct. 8, 2015

(65) Prior Publication Data
US 2017/0113939 A1 Apr. 27, 2017

(30) Foreign Application Priority Data

Apr. 1, 2014 (JP) ................................ 2014-075104

(51) Int. Cl.
| | | |
|---|---|---|
| C01B 33/18 | (2006.01) | |
| B01J 23/72 | (2006.01) | |
| B01J 21/06 | (2006.01) | |
| B01J 35/10 | (2006.01) | |
| B09B 3/00 | (2006.01) | |
| C01G 23/08 | (2006.01) | |
| B01J 35/00 | (2006.01) | |

(52) U.S. Cl.
CPC ............ *C01B 33/18* (2013.01); *B01J 21/063* (2013.01); *B01J 23/72* (2013.01); *B01J 35/0026* (2013.01);
(Continued)

(58) Field of Classification Search
CPC ......... C01B 33/18; B01J 21/063; B01J 23/72; B01J 35/0026; B01J 35/1014;
(Continued)

(56) References Cited

U.S. PATENT DOCUMENTS

| 8,519,203 B2 * | 8/2013 | Marinangeli ............ C10G 3/44 44/605 |
| 2011/0178358 A1 | 7/2011 | Kashimoto |
| 2014/0316018 A1 | 10/2014 | Shimizu et al. |

FOREIGN PATENT DOCUMENTS

| CN | 102602941 A | 7/2012 |
| JP | H07-213913 A | 8/1985 |

(Continued)

OTHER PUBLICATIONS

International Search Report issued in corresponding International Patent Application No. PCT/JP2015/060289 dated Jun. 23, 2015 (English translation) (2 pages).

(Continued)

*Primary Examiner* — James A Fiorito
(74) *Attorney, Agent, or Firm* — Kilyk & Bowersox, P.L.L.C.

(57) ABSTRACT

Rice straw and chaff that are discharged as agricultural waste in large amounts are effectively utilized. The present invention has been completed on the basis of the finding that silica can be recovered with high efficiency by bringing heated titanium oxide into contact with a silica-containing plant body.

13 Claims, 1 Drawing Sheet

(52) U.S. Cl.
CPC ....... *B01J 35/1014* (2013.01); *B01J 35/1038* (2013.01); *B01J 35/1042* (2013.01); *B09B 3/0083* (2013.01); *C01G 23/08* (2013.01); *C01P 2004/32* (2013.01); *C01P 2004/51* (2013.01); *C01P 2004/60* (2013.01); *C01P 2004/61* (2013.01); *C01P 2006/11* (2013.01); *C01P 2006/12* (2013.01); *C01P 2006/14* (2013.01)

(58) Field of Classification Search
CPC ............... B01J 35/1038; B01J 35/1042; B09B 3/0083; C01G 23/08
See application file for complete search history.

(56) References Cited

FOREIGN PATENT DOCUMENTS

| | | |
|---|---|---|
| JP | 2003-529518 A | 10/2003 |
| JP | 2006-517900 A | 8/2006 |
| WO | 0174712 A1 | 10/2001 |
| WO | 2004073600 A2 | 9/2004 |
| WO | 2013089222 A1 | 6/2013 |

OTHER PUBLICATIONS

International Preliminary Report on Patentability and Written Opinion issued in corresponding International Patent Application No. PCT/JP2015/060289 dated Oct. 4, 2016 (English translation) (8 pages).

Office Action issued in corresponding Japanese Patent Application No. 2016-511973—English translation (2 pages).

Extended European Search Report issued in corresponding European Patent Application No. 15 773 032.6 dated Oct. 27, 2017 (5 pages).

Office Action received in corresponding Chinese Patent Application No. 201580028996.X dated Feb. 12, 2018 (English translation only (3 pages).

* cited by examiner

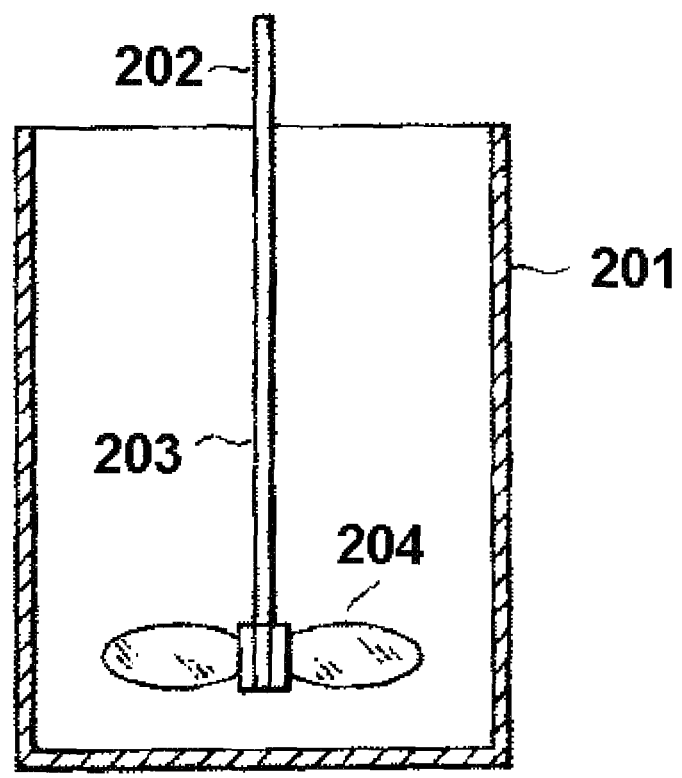

METHOD FOR RECOVERING SILICA FROM SILICA-CONTAINING PLANT BODY USING TITANIUM OXIDE

TECHNICAL FIELD

The present invention relates to a method of recovering silica from a silica-containing plant body through use of titanium oxide, and more particularly, to a method of recovering silica from chaff through use of heated titanium oxide granules.

The present application is a National Stage Application of PCT/JP2015/060289, filed Mar. 31, 2015, which claims priority from Japanese Patent Application No. 2014-075104, which are incorporated herein by reference.

BACKGROUND ART

Silica refers to silicon dioxide ($SiO_2$) or refers generally to substances each of which is mainly formed of silicon dioxide. Silica is produced in large amounts as a main component of each of naturally occurring quartzite and silica sand, which, however, contain large amounts of impurities. Production of a semiconductor or a solar cell requires silica, but silica for such use has a high purity and is expensive.

Rice straw and chaff that are discharged as agricultural waste in large amounts are mostly discarded unutilized. In view of this, attempts have been made to recover silica contained in each of the rice straw and the chaff.

As the attempts to recover silica, the following patent applications have been reported.

In Patent Literature 1, there is a disclosure of a "method of producing high-purity silica from chaff, including the steps of: (a) treating chaff with a hydrofluoric acid HF solution to extract a silicon compound contained in the chaff as hexafluorosilicic acid $H_2SiF_6$; (b) adding ammonia to the extract to convert the hexafluorosilicic acid to ammonium hexafluorosilicate $(NH_4)_2SiF_6$ to be decomposed into ammonium fluoride $NH_4F$ and silica $SiO_2$; (c) separating silica precipitated as amorphous powder by filtration, followed by water washing and drying, to obtain high-purity silica; and (d) adding a strong acid to a filtrate containing the ammonium fluoride to generate hydrogen fluoride, which is subjected to cyclic use in the step (a)."

The recovery method disclosed in Patent Literature 1, in which the treatment with hydrofluoric acid is performed, is obviously different from a recovery method of the present application.

In Patent Literature 2, there is a disclosure of a "method of producing amorphous silica from chaff, characterized by: treating chaff with an acetic acid-containing solution to separate an alkali component contained in the chaff from the chaff through dissolution in the acetic acid-containing solution; washing and drying the chaff from which the alkali component has been separated; carbonizing the dried chaff through thermal decomposition to form chaff charcoal; and calcining the chaff charcoal to produce high-purity silica."

However, the recovery method disclosed in Patent Literature 2, in which the acetic acid treatment is performed, is obviously different from the recovery method of the present application.

In Patent Literature 3, there is a disclosure of a "production method for finely powdered silica, characterized by: dissolving precipitated silica derived from a natural product in liquefied carbon to prepare a silica-containing solution; compressing the silica-containing solution; and then rapidly decompressing the compressed silica-containing solution to cause expansion, to thereby evaporate carbon dioxide in the solution and recover finely powdered silica."

However, the recovery method disclosed in Patent Literature 3, in which the dissolution treatment with liquefied carbon and the like are performed, is obviously different from the recovery method of the present application.

In Patent Literature 4, there is a disclosure of a "method for separating one or more components of interest from a sample comprising the steps of: (a) filtering a sample containing particulates and soluble materials through silica filter media whose surface active groups have reacted with one or more silanes; (b) simultaneously capturing particulates and binding a soluble component of interest to the silica filter media; and (c) eluting the component of interest from the silica filter media."

However, the recovery method disclosed in Patent Literature 4, in which the sample is filtered through the filter media having surfaces treated with silanes, is obviously different from the recovery method of the present application.

In recent years, there have been proposed various methods of treating and recycling plastic waste, and further, parts thereof have been practically employed. As a potent one of such methods of treating plastic waste, there has been proposed an apparatus and method involving gasifying the plastic waste by heating chips of the plastic waste in the presence of a decomposition catalyst of titanium oxide known as a photocatalyst (see Patent Literatures 5 and 6).

In addition, various catalysts to be used in decomposition treatment of the plastic waste have been investigated (Patent Literatures 7 to 12).

CITATION LIST

Patent Literature

[PTL 1] JP 7-57684 A
[PTL 2] JP 2008-214158 A
[PTL 3] JP 2011-016690 A
[PTL 4] JP 2013-049054 A
[PTL 5] JP 2002-363337 A
[PTL 6] JP 2004-182837 A
[PTL 7] JP 2005-066433 A
[PTL 8] JP 2005-205312 A
[PTL 9] JP 2005-307007 A
[PTL 10] WO 2007/122967 A1
[PTL 11] WO 2010/021122 A1
[PTL 12] WO 2013/089222 A1

SUMMARY OF INVENTION

Technical Problem

It is an object of the present invention to effectively utilize rice straw and chaff that are discharged as agricultural waste in large amounts.

Solution to Problem

The inventors of the present invention have made extensive investigations in order to achieve the above-mentioned object, and as a result, have found that silica can be recovered with high efficiency by bringing heated titanium oxide into contact with a silica-containing plant body. Thus, the inventors have completed the present invention.

That is, the present invention is as described below.

"1. A recovery method for silica, including bringing heated titanium oxide into contact with a silica-containing plant body.

2. A recovery method according to Item 1, in which the silica-containing plant body includes any one of chaff, unhulled rice, straw, and bran.

3. A recovery method according to Item 1 or 2, in which the contact includes stirring the silica-containing plant body together with the heated titanium oxide.

4. A recovery method according to any one of Items 1 to 3, in which the titanium oxide includes titanium oxide granules.

5. A recovery method according to any one of Items 1 to 4, in which a heating temperature of the titanium oxide falls within a range of from 300° C. to 700° C.

6. A recovery method according to any one of Items 1 to 5, in which the titanium oxide granules have the following characteristics:
(1) the granules each have a substantially spherical shape; and
(2) granules each having a particle diameter of from 0.2 mm to 1.0 mm account for 70% or more of all the granules.

7. A recovery method according to Item 6, in which the characteristic "the granules each have a substantially spherical shape" includes the following characteristics:
(1) an angle at which a granule first starts sliding is from 0.5° to 15.0°; and
(2) an angle at which all the granules finish sliding is from 2.0° to 30.0°.

8. A recovery method according to any one of Items 1 to 7, in which the granules each have a specific surface area in a range of from 30 m$^2$/g to 70 m$^2$/g.

9. A recovery method according to any one of Items 1 to 8, in which the granules each have a tap density in a range of from 1.00 g/mL to 1.80 g/mL.

10. A recovery method according to any one of Items 1 to 9, in which the granules each have a pore volume in a range of from 0.10 cc/g to 0.60 cc/g.

11. A recovery method according to any one of Items 1 to 10, in which the titanium oxide granules have the following characteristic:
(1) the titanium oxide granules include titanium oxide granules obtained by drying a sol of titanium oxide to produce a titanium oxide gel, calcining the titanium oxide gel at a temperature in a range of from 450° C. to 850° C., and crushing the calcined product, followed by edge treatment, include particles each having a particle diameter of from 0.5 mm to 1.18 mm at a ratio in a range of from 50 wt % to 95 wt %, and each have a wear ratio of 2.0% or less.

12. A recovery method according to any one of Items 1 to 5, in which the titanium oxide granules have the following characteristic (1) or (2):
(1) a particle size distribution in the following range: titanium oxide granules each having a particle size of 1.4 mm or more account for from 0 wt % to 1.0 wt %;
titanium oxide granules each having a particle size of from 1.0 mm to 1.4 mm account for from 0 wt % to 10.0 wt %;
titanium oxide granules each having a particle size of from 0.6 mm to 1.0 mm account for from 10 wt % to 60.0 wt %;
titanium oxide granules each having a particle size of from 0.3 mm to 0.6 mm account for from 10 wt % to 60.0 wt %;
titanium oxide granules each having a particle size of from 0.125 mm to 0.3 mm account for from 0 wt % to 30.0 wt %; and titanium oxide granules each having a particle size of 0.125 mm or less account for from 0 wt % to 30.0 wt %; or
(2) a particle size distribution in the following range:
titanium oxide granules each having a particle size of 1.4 mm or more account for 0 wt %;
titanium oxide granules each having a particle size of from 1.0 mm to 1.4 mm account for from 0 wt % to 2.0 wt %;
titanium oxide granules each having a particle size of from 0.6 mm to 1.0 mm account for from 27 wt % to 60.0 wt %;
titanium oxide granules each having a particle size of from 0.3 mm to 0.6 mm account for from 30 wt % to 55.0 wt %; titanium oxide granules each having a particle size of from 0.125 mm to 0.3 mm account for from 0 wt % to 20.0 wt %; and titanium oxide granules each having a particle size of 0.125 mm or less account for from 0 wt % to 25.0 wt %.

13. A recovery method according to any one of Items 1 to 5, in which the titanium oxide granules have the following characteristic:
(1) a particle size distribution in the following range: titanium oxide granules each having a particle size of 1.2 mm or more account for from 1 wt % to 50 wt %;
titanium oxide granules each having a particle size of from 0.5 mm to 1.2 mm account for from 40 wt % to 90 wt %; and titanium oxide granules each having a particle size of 0.5 mm or less account for from 1 wt % to 20 wt %.

14. A recovery method according to any one of Items 1 to 5, in which the titanium oxide granules have the following characteristic:
(1) a particle size distribution in the following range: titanium oxide granules each having a particle size of 1.2 mm or more account for from 10 wt % to 60 wt %; and titanium oxide granules each having a particle size of from 0.5 mm to 1.2 mm account for from 40 wt % to 90 wt %.

15. A recovery method according to any one of Items 1 to 14, in which the titanium oxide granules have copper oxide or copper supported thereon.

16. A recovery method according to Item 15, in which an amount of the copper oxide to be supported is from 0.5 wt % to 5.0 wt % in terms of copper oxide."

Advantageous Effects of Invention

The method of recovering silica from a silica-containing plant body through use of titanium oxide according to the present invention, in particular, the method of recovering silica from chaff through use of titanium oxide granules has the following remarkable effects as compared to a related-art recovery method:

(1) providing a high purity of soluble silica;

(2) having high recovery efficiency, in particular, a high recovery ratio of soluble silica;

(3) allowing treatment at a low temperature of about 500° C. as compared to incineration treatment;

(4) requiring no treatment with a strong acid or the like, resulting in less environmental burden; and (5) allowing treatment at ordinary pressure, thus eliminating a risk involved in high-pressure treatment.

BRIEF DESCRIPTION OF DRAWINGS

FIG. 1 is a view for illustrating an apparatus for measuring the wear ratio of titanium oxide granules.

DESCRIPTION OF EMBODIMENTS

The Present Invention

The present invention relates to a "method of recovering silica from a silica-containing plant body through use of titanium oxide." In particular, the present invention relates to a "method of recovering silica from chaff through use of heated titanium oxide granules." The details are described below.

Silica-containing Plant Body

The "silica-containing plant body" of the present invention is not particularly limited as long as the silica-containing plant body is a plant body or part thereof containing silica. Examples thereof may include chaff, unhulled rice, straw, and bran of a grass family (e.g., rice, wheat, barley, oat, rye, proso millet, foxtail millet, Japanese barnyard millet, maize, finger millet, sorghum, bamboo, Indian rice, sugar cane, adlay, reed, Japanese silver grass, arrow bamboo, giant cane, pampas grass, or lawn grass). Of those, chaff and straw are preferred, and chaff is more preferred.

Titanium Oxide

The "titanium oxide" to be used in the present invention is not particularly limited, and may be any of powder titanium oxide and titanium oxide granules. However, in consideration of separation (e.g., separation with a sieve) of the recovered silica from the titanium oxide, titanium oxide granules are preferred.

Titanium Oxide Granules

The "titanium oxide granules" of the present invention not only contain titanium oxide as an active component, but also may have copper and/or copper oxide supported thereon.

{Heating Temperature of Titanium Oxide (Titanium Oxide Granules)}

The "heating temperature of the titanium oxide" of the present invention at least needs to be 300° C. or more and 700° C. or less, and falls within the range of preferably 350° C. or more, particularly preferably from 420° C. to 560° C., still more preferably from 480° C. to 550° C., most preferably from 500° C. to 530° C.

The heating temperature is a temperature in a reaction tank for causing the titanium oxide and the silica-containing plant body to react with each other, and refers to a set temperature for keeping the set temperature of the titanium oxide. That is, even when the set temperature is 480° C., the range of fluctuation of the temperature of the titanium oxide granules in the reaction tank is about ±30° C. with respect to the set temperature.

Further, at a certain position in the reaction tank, the temperature may become higher or lower than the particularly preferred "heating temperature of the titanium oxide" of the present invention depending on the shape and size of the reaction tank. However, it suffices that the preferred heating temperature is maintained in most part of the titanium oxide.

In the recovery method of the present invention, through use of the titanium oxide under the optimal heating condition, silica can be recovered with high efficiency. Further, the titanium oxide can easily decompose components contained in the silica-containing plant body except for silica (organic substances, such as cellulose, lignin, and hemicellulose).

Further, the recovery method of the present invention is not particularly limited as long as the heated titanium oxide can be brought into contact with the silica-containing plant body. However, it is preferred that the titanium oxide and the silica-containing plant body be stirred instead of being merely placed in a reaction container, left to stand still, and heated. A method of stirring the titanium oxide and the silica-containing plant body is not particularly limited. A reaction container having introduced thereinto a stirrer may be used, and an apparatus configured such that the titanium oxide and the silica-containing plant body can be circulated and stirred in the reaction container is preferably used.

The apparatus configured such that the titanium oxide and the silica-containing plant body can be circulated and stirred in the reaction container may be exemplified by a decomposition apparatus disclosed in WO 2007/122967 A1 or WO 2009/051253 A1, but is not particularly limited thereto.

Particle Diameter of Titanium Oxide (Titanium Oxide Granules)

The titanium oxide to be used in the recovery method of the present invention has a "particle diameter" of from 0.20 mm to 1.2 mm, preferably from 0.30 mm to 1.0 mm, more preferably from 0.40 mm to 1.0 mm, most preferably from 0.40 mm to 0.80 mm.

More specifically, titanium oxide having a particle diameter of from 0.20 mm to 1.2 mm, preferably from 0.3 mm to 1.0 mm, more preferably from 0.40 mm to 1.0 mm, most preferably from 0.40 mm to 0.80 mm account for 70% or more, preferably 80% or more, more preferably 90% or more of all the titanium oxide before use.

In addition, the main distribution of the particle diameters of the titanium oxide before use is from 0.4 mm to 0.6 mm, preferably about 0.50 mm.

In consideration of separation (e.g., separation with a sieve) of the recovered silica from the titanium oxide, titanium oxide granules having large particle diameters are preferably used.

For example, titanium oxide having a particle diameter of from 0.5 mm to 1.2 mm is used.

For the particle diameters in the above-mentioned ranges, reference may be made to the contents disclosed in WO 2010/021122 A1.

In addition, the titanium oxide to be used in the recovery method of the present invention may have "particle diameters" in the following ranges:

titanium oxide having a particle diameter of 1.4 mm or more accounts for from 0 wt % to 1.0 wt %;

titanium oxide having a particle diameter of from 1.0 mm to 1.4 mm accounts for from 0 wt % to 10.0 wt %;

titanium oxide having a particle diameter of from 0.6 mm to 1.0 mm accounts for from 10 wt % to 60.0 wt %;

titanium oxide having a particle diameter of from 0.3 mm to 0.6 mm accounts for from 10 wt % to 60.0 wt %;

titanium oxide having a particle diameter of from 0.125 mm to 0.3 mm accounts for from 0 wt % to 30.0 wt %; and titanium oxide having a particle diameter of 0.125 mm or less accounts for from 0 wt % to 30.0 wt %.

More specifically, the titanium oxide has a particle size distribution in the following range:

titanium oxide having a particle size of 1.4 mm or more accounts for 0 wt %;

titanium oxide having a particle size of from 1.0 mm to 1.4 mm accounts for from 0 wt % to 2.0 wt %;

titanium oxide having a particle size of from 0.6 mm to 1.0 mm accounts for from 27 wt % to 60.0 wt %;

titanium oxide having a particle size of from 0.3 mm to 0.6 mm accounts for from 30 wt % to 55.0 wt %; titanium oxide having a particle size of from 0.125 mm to 0.3 mm accounts for from 0 wt % to 20.0 wt %; and titanium oxide having a particle size of 0.125 mm or less accounts for from 0 wt % to 25.0 wt %.

The particle diameters in the above-mentioned ranges have already been found in Example 1 of the present invention.

In addition, the titanium oxide to be used in the recovery method of the present invention may have "particle diameters" in the following ranges:

titanium oxide having a particle diameter of 1.2 mm or more accounts for from 1 wt % to 50 wt %;

titanium oxide having a particle diameter of from 0.5 mm to 1.2 mm accounts for from 40 wt % to 90 wt %; and titanium oxide having a particle diameter of 0.5 mm or less accounts for from 1 wt % to 20 wt %; or titanium oxide having a particle diameter of 1.2 mm or more accounts for from 10 wt % to 60 wt %; and titanium oxide having a particle diameter of from 0.5 mm to 1.2 mm accounts for from 40 wt % to 90 wt %.

For the particle diameters in the above-mentioned ranges, reference may be made to the contents disclosed in JP 4848479 B2.

Titanium Oxide Granules Each have Substantially Spherical Shape

The phrase "the granules each have a substantially spherical shape" in the present invention means that the surface of each of the granules (particles) is rounded off and the degree of spherical shape in particle shape is higher as compared to the shape of related-art titanium oxide.

As indicators for showing that the degree of spherical shape in particle shape is higher, there are given, for example, a "circularity", a "slant angle for rolling of granules (particles)", and a "rest angle".

For the details, reference may be made to WO 2013/089222 A1.

A "method of measuring a circularity" of the present invention may be carried out under the following condition and with the following apparatus.

Condition

A CCD camera is fixed to an inverted microscope, and the processing of images is performed with Image-Pro Plus. Specifically, titanium oxide granules are placed in a plastic petri dish so that the granules do not overlap with each other, images are taken into the inverted microscope described below at a magnification of four times, and the circularity of each granule is automatically measured by using Image-Pro Plus.

Apparatus

Microscope: inverted microscope TMD-300, Nippon Kogaku K.K. (Nikon Corporation), CCD camera: Nippon Roper K.K., Retiga2000R (1,600× 1,200 pixels)

Image processing apparatus: Nippon Roper K.K., Image-Pro Plus

The "circularity" of each of the titanium oxide granules to be used in the recovery method of the present invention is from 1.00 to 2.00, preferably from 1.00 to 1.50, more preferably from 1.00 to 1.40, still more preferably from 1.00 to 1.30, most preferably from 1.00 to 1.20.

More specifically, titanium oxide granules each having a circularity of from 1.00 to 2.00, preferably from 1.00 to 1.50, more preferably from 1.00 to 1.40, still more preferably from 1.00 to 1.30, most preferably from 1.00 to 1.20 account for 70% or more, preferably 80% or more, more preferably 90% or more of all the titanium oxide granules before use.

The "slant angle for rolling of granules" of the present invention may be measured under the following conditions.

20 g of titanium oxide granules are placed on a glass plate, and the angle of the glass plate is changed from horizontal (0°) to slanted, to thereby measure (1) an angle at which a titanium oxide granule first starts sliding and (2) an angle at which all granules finish sliding.

The values of the "slant angle for rolling of granules" of the titanium oxide granules to be used in the recovery method of the present invention are as described below.

(1) The angle at which a granule first starts sliding is from 0.5° to 15.0°, preferably from 0.5° to 10.0°, more preferably from 0.5° to 8.0°, most preferably from 0.5° to 5.0°.

(2) The angle at which all granules finish sliding is from 2.0° to 30.0°, preferably from 2.0° to 25.0°, more preferably from 2.0° to 22.0°, most preferably from 2.0° to 18.0°.

The "rest angle" of the present invention may be measured by the following method.

20 g of unused titanium oxide granules are dropped with a funnel to form a mountain-like layer, and the angle between the slant of the layer and the horizontal plane is measured. The rest angle of powders and granules having better flowability is smaller, and in contrast, the rest angle of powders and granules having worse flowability is larger.

The "rest angle" of the titanium oxide granules to be used in the recovery method of the present invention is from 15° to 35°, preferably from 20° to 35°.

In addition, a "tap density" is given as another indicator for showing characteristics of the titanium oxide granules to be used in the recovery method of the present invention.

In the present invention, the tap density of the titanium oxide granules may be measured as described below.

About 180 g of titanium oxide granules are loaded into a 200 mL graduated cylinder made of glass, and the graduated cylinder is naturally dropped repeatedly ten times from the 50 mm-high position on a rubber sheet having a thickness of 10 mm. After that, the graduated cylinder is hit to a side of a wooden plate ten times from a 50 mm-distant position. Then, the above-mentioned operations are repeated two times. After that, the scale of the graduated cylinder is read to define the resultant value as the volume V (mL) of the granules. Different granules are dried at 110° C. for 3 hours, and then the weight M (g) of the resultant granules is measured. On the basis of the values, the tap density is calculated from the expression M/V.

The "tap density" of the titanium oxide granules to be used in the recovery method of the present invention is from 1.00 g/mL to 1.80 g/mL, preferably from 1.03 g/mL to 1.60 g/mL, more preferably from 1.05 g/mL to 1.40 g/mL.

In addition, a "wear ratio" is given as still another indicator for showing characteristics of the titanium oxide granules to be used in the recovery method of the present invention.

The wear ratio of the titanium oxide (granules) of the present invention may be measured by the following method.

The wear ratio is measured with a wear ratio measuring apparatus illustrated in FIG. 1. That is, the wear ratio measuring apparatus includes a sample container 201 having an inner diameter of 63 mm and a depth of 86 mm and a stirrer 202 fixed to the sample container, and the stirrer 202 includes a shaft 203 and three oval stirring blades 204 each having a length of 20 mm fixed to the lower end part of the shaft so as to extend at a 60° interval in the diameter direction from the shaft, with each of the stirring blades slanted so as to have an angle of 45° with respect to the horizontal plane. Each of the stirring blades is positioned so that the distance from its lowest edge to the bottom of the sample container is 8 mm.

When the wear ratio of the titanium oxide granules is measured, 150 mL of the titanium oxide granules are weighed with a 200 mL graduated cylinder, and the resultant weight is recorded. After that, all the titanium oxide granules weighed are fed into the sample container and are stirred by using the stirrer described above at 300 rpm for 30 minutes. Then, the sample is taken out of the sample container and the whole is transferred onto a sieve having a mesh size of 0.5 mm. A sample passing through the sieve is weighed. Here, when the weight of the sample passing through the sieve having a mesh size of 0.5 mm is defined as W and the weight of the sample subjected to the measurement is defined as $W_0$, the wear ratio A of the sample is calculated according to $A=(W/W_0)\times100(\%)$.

The "wear ratio" of the titanium oxide granules to be used in the recovery method of the present invention is 2.0 wt % or less, preferably 1.5 wt % or less, more preferably 1.0 wt % or less.

In addition, a "specific surface area" is given as still another indicator for showing characteristics of the titanium oxide (granules) to be used in the recovery method of the present invention.

The specific surface area of the titanium oxide granules of the present invention may be measured by the following method.

A BET method is used to carry out measurement in the present invention. The details of the measurement are as described below.

The BET method is a method involving causing molecules whose adsorption occupancy area is known to adsorb onto the surfaces of powder particles at a temperature of liquid nitrogen and determining the specific surface area of a sample on the basis of the adsorption amount.

In the present invention, a 2300-model automatic measurement apparatus (Shimadzu Corporation, manufacturer) is used as a specific surface area measurement apparatus.

The "specific surface area" of the titanium oxide (granules) to be used in the recovery method of the present invention is 30 $m^2/g$ or more, preferably from 33 $m^2/g$ to 80 $m^2/g$, more preferably from 35 $m^2/g$ to 70 $m^2/g$.

Further, the specific surface area of the titanium oxide granules before use is from 30 $m^2/g$ to 70 $m^2/g$.

As the specific surface area becomes larger, the contact surfaces between the granules and the silica-containing plant body become larger, and hence recovery efficiency can be enhanced. However, when the specific surface area is too large, the thermal resistance of the granules becomes weak and the granules are liable to collapse and to turn to powder.

In addition, in the "titanium oxide (granules)" of the present invention, the pore volume of the titanium oxide serving as an active component is from 0.05 ml/g to 1.00 ml/g, preferably from 0.07 ml/g to 0.80 ml/g, more preferably from 0.10 ml/g to 0.60 ml/g.

A method known per se may be used as a method of measuring the pore volume of the titanium oxide granules. In the present invention, a mercury intrusion method is used for the measurement. The details thereof are as described below.

The mercury intrusion method is a method involving applying pressure so as to cause mercury to penetrate into pores of powders by taking advantage of the large surface tension of mercury and determining a pore volume on the basis of the value of the pressure and the amount of mercury intruded.

In the present invention, a porosimeter (mercury intrusion type, highest pressure: 200 MPa) manufactured by Thermo Finnigan Inc. was used.

In addition, in the present invention, the titanium oxide granules include titanium oxide granules obtained by drying a sol of titanium oxide to produce a titanium oxide gel, calcining the titanium oxide gel at a temperature in the range of from 450° C. to 850° C., and crushing the calcined product, followed by edge treatment, include particles each having a particle diameter of from 0.5 mm to 1.18 mm at a ratio in the range of from 50 wt % to 95 wt %, and each have a wear ratio of 2.0% or less.

For the details, reference may be made to JP 2005-307007 A.

In the present invention, the titanium oxide granules described above may have copper oxide or copper supported thereon. The amount of copper oxide to be supported is not particularly limited, but is preferably from 0.5 wt % to 5.0 wt % in terms of copper oxide.

For the details, reference may be made to WO 2013/089222 A1.

The "titanium oxide granules" or "titanium oxide granules having copper oxide or copper supported thereon" of the present invention allow silica to be recovered with high efficiency over a long period of time, by virtue of having the above-mentioned characteristics.

Further, in the "titanium oxide granules" of the present invention, the distribution of particle diameters of the titanium oxide granules is narrower than the distribution of particle diameters of the related-art titanium oxide. Thus, by using a sieve having a larger mesh size and a sieve having a smaller mesh size than the particle distribution of the titanium oxide granules, the granules and silica can be easily separated.

Production Method for Titanium Oxide Granules

A "production method for the titanium oxide granules" of the present invention involves subjecting a titania sol (also including, as necessary, at least one kind of sol selected from a silica sol, an alumina sol, and a zirconia sol) to stirring granulation to yield granules each having a spherical shape, followed preferably by calcination at a temperature in the range of from 400° C. to 850° C. Then, sieving is performed to yield calcined granules each having a specific particle diameter.

The stirring granulation may utilize a method known per se, and the following granulation is preferred: a liquid binder (the above-mentioned sol in the present invention) is stirred, and a shearing effect due to a high-speed stirring blade yields consolidated aggregates of the above-mentioned powder.

Further, the following granulation may be adopted: powder of an inorganic oxide and a liquid binder (the above-mentioned sol in the present invention) are stirred, and the aggregation of the powder due to the sol and a shearing effect due to a high-speed stirring blade yield consolidated aggregates of the above-mentioned powder.

Depending on the amount of the sol, the number of rotations of the stirring blade, a granulation time, and the like, the consolidation degree and size of each of the resultant aggregated granules may be arbitrarily adjusted. In addition, through appropriate selection of a base plate in a granulation container in a stirring granulation apparatus, the shape of each of the resultant aggregates may be made closer to a sphere.

In the present invention, a granulator for the stirring granulation is not particularly limited. For example, there are preferably used a mixer granulator NMG series manufactured by Nara Machinery Co., Ltd., a high-speed mixer and HIGH FLEX GRAL manufactured by Fukae Powtec Co., Ltd., an Eirich intensive mixer (Eirich reverse-flow type high-speed mixer) manufactured by Nippon Eirich Co., Ltd., a high-speed stirring granulator HSG series manufactured by G-Labo, Inc., a kneader/high-speed stirring granulator SPG series and a high-speed mixer/grinder spartan granulator manufactured by Dalton Co., Ltd., a vertical granulator VG-CT series manufactured by Powrex Corporation, and the like.

In order to further enhance the sphericalness of the granules obtained above and also to make the particle size distribution of the granules more precise, the granules obtained by the stirring granulation may be additionally granulated in the presence of the sol by at least one kind of method selected from tumbling granulation and fluidized-bed granulation.

In the granulation, in order to make the resultant granules harder and further enhance the wear resistance of the granules, a mixture of a ground product of the inorganic oxide and a ground product obtained by drying and calcining the sol, followed by pulverization may be used together with the sol.

The tumbling granulation refers to, as already known well, a granulation method involving giving a tumbling motion to a mixture of powder and a liquid binder, to thereby yield aggregated granules. The fluidized-bed granulation refers to, as also already known well, a granulation method involving supplying a liquid binder into a fluidized bed of powder and causing the formation of bridges between particles owing to the binder, to thereby yield aggregated granules.

As mentioned above, the granules obtained by the stirring granulation are additionally granulated by at least one kind of method selected from the tumbling granulation and the fluidized-bed granulation, and then the granules obtained are, as described above, calcined at a temperature in a range of from 400° C. to 850° C., followed by sieving, to thereby collect particles each having a particle diameter in a range of from 0.1 mm to 1.2 mm (or from 0.1 mm to 1.4 mm). As a result, granules each having a necessary particle size can be obtained.

A tumbling granulator and a fluidized-bed granulator (combined granulator) for the granulation mentioned above are not particularly limited as well. Examples thereof may include a fluidized-bed granulation apparatus "NEW/MARUMERIZER" and a spheronizer "MARUMERIZER" manufactured by Dalton Co., Ltd., and a fluidized-bed granulation apparatus and a tumbling/fluidizing coating apparatus "Multiplex" series manufactured by Powrex Corporation.

Apparatus to be Used in Recovery Method of the Present Invention

A decomposition apparatus for plastics and organic substances known per se may be utilized as an apparatus to be used in the recovery method of the present invention. In particular, preferred titanium oxide granules to be used in the recovery method of the present invention exhibit very high recovery efficiency. Accordingly, it is preferred to use a catalyst-circulating decomposition apparatus for plastic and organic waste, the apparatus being high in efficiency in the contact of the granules with the silica-containing plant body, rather than a related-art batch-type decomposition apparatus. The catalyst-circulating decomposition apparatus for plastic and organic waste is disclosed in WO 2007/122967 A1 or WO 2009/051253 A1.

Further, the above-mentioned decomposition apparatus includes oxidation catalyst treatment means and/or reduction catalyst treatment means, and further includes preferably lime neutralization treatment means.

In addition, the decomposition apparatus to be used in the recovery method of the present invention may include any one or more means selected from the following:
(1) alumina catalyst treatment means;
(2) means for grinding a silica-containing plant body;
(3) carrier gas supply means;
(4) means for collecting scattered metals, inorganic substances, and/or catalysts discharged from a reaction tank for means for treating a silica-containing plant body;
(5) cyclone dust collection means (first dust collection means);
(6) dust collection means with a bag filter (second dust collection means);
(7) heat exchange means;
(8) preheater means;
(9) exhaust blower means;
(10) cooling means;
(11) heat recovery means;
(12) hydrogen chloride continuous measurement means;
(13) CO continuous measurement means;
(14) alarm means; and
(15) oxidation catalyst treatment means and/or reduction catalyst treatment means.

The number of rotations of the stirring of the titanium oxide granules and the silica-containing plant body is from 3 rpm to 70 rpm, preferably from 10 rpm to 60 rpm, more preferably from 10 rpm to 30 rpm, though the number of rotations varies depending on the volume of a reaction container, the shape of a stirring blade, and a stirring method. Regardless of whether the reaction container adopts a batch system or a circulation system, the same number of rotations is preferred.

Those values are ones set by considering the fact that when the number of rotations is too large, the titanium oxide granules wear to a large extent, but when the number of rotations is small, the efficiency in the contact of the titanium oxide granules with the silica-containing plant body becomes lower.

Applications of Recovered Silica

Recently, it has been reported that the utilization of soluble silica in an electrode of a lithium-ion battery dramatically enhances the performance of the battery. High-purity amorphous silica (in particular, soluble silica) recovered by the recovery method of the present invention is very effective for use in an electrode of a lithium-ion battery.

Further, high-purity amorphous silica (in particular, soluble silica) recovered by the recovery method of the present invention can be utilized in, for example, cosmetics and pharmaceuticals (a component for preventing solidification of a cosmetic for eye shadow or foundation due to moisture, a stabilizing component of cream or milky lotion, and an abrasive component of toothpaste), food additives (brewing products, such as beer, sake, and mirin, edible oil, soy sauce, sauce, sugar, a canned food), and industrial products (components of a drying agent, a deodorant, an agricultural fertilizer, a desiccant, an abrasive, a heat-resistant instrument, a laboratory instrument, a raw material for optical fiber, enamel, silica cement, ceramics, a liquid chromatography carrier, a light bulb, a CRT display, printing ink for newspaper, and the like).

In addition, amorphous silica (in particular, soluble silica) is known as an essential mineral contained in skin, hair, bones, and the like in a living body. In particular, water-soluble (soluble) silica can be utilized for mineral water and health foods. In addition, silica is known to have an effect on osteoporosis prevention, and hence can also be utilized as a composition for preventing and treating osteoporosis.

The present invention is described below by way of Examples, but the present invention is by no means limited to Examples.

Example 1

Production of Titanium Oxide Granules to be Used in Recovery Method for Silica of the Present Invention Titanium oxide granules to be used in the present invention were produced by a plurality of methods described below. The details are as described below.

(1) Titanium Oxide Granules 1

In a titanium oxide production process using a sulfuric acid method, a slurry of titanium hydroxide obtained through a hydrolysis step was filtered and washed with water, followed by repulping, to thereby yield Slurry A. Nitric acid was added as a solating agent to Slurry A to yield Sol B of titanium oxide. Further, part of Sol B was heated to 100° C. and dried to produce a dried gel. The dried gel was calcined at 500° C. for 3 hours in an electrical furnace to yield Calcined titanium oxide C.

Calcined titanium oxide C was ground and the resultant ground product was granulated while a 5-fold dilution of Sol B diluted with water was being sprayed, by using a high-speed stirring granulator, model SPG-25, manufactured by Dalton Co., Ltd. under the conditions of 250 rpm for a stirring blade and 3,000 rpm for a high-speed chopper, to thereby yield titanium oxide particles.

The titanium oxide particles were dried at 100° C. for 3 hours and were then calcined at 600° C., followed by sieving with a sieve having a mesh size of 1.19 mm and a sieve having a mesh size of 0.104 mm, to thereby yield granules each having a particle diameter of from 0.1 mm to 1.2 mm. The weight of the granules was defined as 100 wt %.

In the present invention, the phrase "granules each having a particle diameter of from 0.1 mm to 1.2 mm" refers to granules obtained by sieving granules by using a 15-mesh standard sieve made of stainless steel wire mesh (wire diameter: 0.5 mm, mesh size: 1.19 mm) and a 150-mesh standard sieve made of stainless steel wire mesh (wire diameter: 0.065 mm, mesh size: 0.104 mm), that is, granules passing through the 15-mesh standard sieve and remaining on the 150-mesh standard sieve.

Specifically, the granules each having a particle diameter of from 0.1 mm to 1.2 mm were obtained in the following manner. That is, the 15-mesh standard sieve was fixed to the upper lid of a Ro-Tap standard sieve shaker manufactured by Yoshida Seisakusho Co., Ltd. and the 150-mesh standard sieve was fixed to the lower tray of the sieve shaker. Then, 100 g of titanium oxide granules were supplied as a sample on the 15-mesh standard sieve, and were subjected to sieving for 3 minutes with shaking rotation at 300 rpm and the number of striking at 150 times/minute, to thereby yield granules passing through the 15-mesh standard sieve and remaining on the 150-mesh standard sieve as the granules each having a particle diameter of from 0.1 mm to 1.2 mm.

The titanium oxide granules obtained above had a BET specific surface area of 60 $m^2/g$, a pore volume measured by a mercury intrusion method of 0.15 mL (cc)/g, a tap density of 1.16 g/mL, and a wear ratio of 0.3%.

(2) Titanium Oxide Granules 2

Slurry A of titanium hydroxide obtained in the section (1) was heated at 100° C. and dried to produce a dried gel. The dried gel was calcined at 500° C. for 3 hours in an electrical furnace and was then subjected to grinding treatment to yield a ground product of Calcined titanium oxide D. 50 Parts by weight of the ground product of Calcined titanium oxide D and 50 parts by weight of the ground product of Calcined titanium oxide C were mixed.

The mixture of 50 parts by weight of the ground product of Calcined titanium oxide D and 50 parts by weight of the ground product of Calcined titanium oxide C was treated in the same manner as in the section (1). The resultant particles were dried, calcined, and sieved to yield granules each having a particle diameter of from 0.1 mm to 1.2 mm.

The titanium oxide granules obtained above had a specific surface area of 62 $m^2/g$, a pore volume of 0.28 mL (cc)/g, a tap density of 1.06 g/mL, and a wear ratio of 1.0%.

(3) Titanium Oxide Granules 3

The titanium oxide granules obtained in the section (1) were further granulated so as to have a more spherical shape by spraying the ground product of Titanium oxide C obtained in the section (1) and a 4-fold dilution of Sol B diluted with water by using a tumbling granulator "MARUMERIZER". The resultant particles were treated in the same manner as in the section (1) to yield granules each having a particle diameter in the range of from 0.1 mm to 1.2 mm.

The titanium oxide granules obtained above had a specific surface area of 59 $m^2/g$, a pore volume of 0.17 mL (cc)/g, a tap density of 1.18 g/mL, and a wear ratio of 0.3%.

(4) Titanium Oxide Granules 4

Sol B of titanium oxide obtained in the section (1) and ammonium tungstate were mixed. The mixture was heated to 100° C. and dried to produce a dried gel. The dried gel was calcined at 500° C. for 3 hours in an electrical furnace to yield a calcined titanium-tungsten composite oxide (weight ratio of titanium oxide/tungsten oxide: 90:10).

Calcined titanium-tungsten composite oxide E thus obtained was ground to produce a ground product. The ground product was granulated while a 5-fold dilution of Sol B diluted with water was being sprayed, by using a high-speed stirring granulator, model SPG-25, manufactured by Dalton Co., Ltd. under the conditions of 250 rpm for a stirring blade and 3,000 rpm for a high-speed chopper, to thereby yield titanium-tungsten composite oxide granules.

Next, the granules were further granulated so as to have a more spherical shape by spraying the ground product of Calcined titanium-tungsten composite oxide E and a 4-fold dilution of Sol B diluted with water by using a spheronizer "MARUMERIZER". The resultant granules were treated in the same manner as in the section (1) to yield granules each having a particle diameter of from 0.1 mm to 1.2 mm.

The titanium oxide granules obtained above had a specific surface area of 69 m²/g, a pore volume of 0.2 ml (cc)/g, a tap density of 1.20 g/ml, and a wear ratio of 0.5%.

(5) Particle Diameter of each of Titanium Oxide Granules

Granules each having a particle diameter (twice a radius) in the range of from 0.2 mm to 1.0 mm, further, from 0.3 mm to 1.0 mm accounted for 70% or more of all the titanium oxide granules obtained above.

More specifically, the granules had particle diameters in the following ranges:

granules each having a particle diameter of 1.4 mm or more account for 0 wt %;

granules each having a particle diameter of from 1.0 mm to 1.4 mm account for from 0 wt % to 2.0 wt %;

granules each having a particle diameter of from 0.6 mm to 1.0 mm account for from 27 wt % to 60.0 wt %;

granules each having a particle diameter of from 0.3 mm to 0.6 mm account for from 30 wt % to 55.0 wt %;

granules each having a particle diameter of from 0.125 mm to 0.3 mm account for from 0 wt % to 20.0 wt %; and granules each having a particle diameter of 0.125 mm or less account for from 0 wt % to 25.0 wt %.

(6) Circularity of each of Titanium Oxide Granules

Granules each having a circularity in the range of from 1.00 to 1.50, further, from 1.00 to 1.30 accounted for 70% or more of all the titanium oxide granules obtained above.

(7) Measurement of Slant Angle for Rolling of Titanium Oxide Granules

The angle at which the titanium oxide granules obtained above first started sliding was from 1.5° to 2.5°.

The angle at which all the titanium oxide granules obtained above finished sliding was from 9.0° to 10.0°.

Example 2

Production of Titanium Oxide Granules Having Copper Oxide Supported thereon to be Used in Recovery Method for Silica of the Present Invention Titanium oxide granules having copper oxide supported thereon to be used in the present invention were produced by a plurality of methods described below. The details of the methods are as described below.

(1) Titanium Oxide Granules 1 Having Copper Oxide Supported Thereon

In a titanium oxide production process using a sulfuric acid method, a slurry of titanium hydroxide obtained through a hydrolysis step was filtered and washed with water, followed by repulping, to thereby yield Slurry A. Nitric acid was added as a solating agent to Slurry A to yield Sol B of titanium oxide. Further, part of Sol B was heated to 100° C. and dried to produce a dried gel. The dried gel was calcined at 500° C. for 3 hours in an electrical furnace to yield Calcined titanium oxide C.

Calcined titanium oxide C was ground and the resultant ground product was granulated while a 5-fold dilution of Sol B diluted with water was being sprayed, by using a high-speed stirring granulator, model SPG-25, manufactured by Dalton Co., Ltd. under the conditions of 250 rpm for a stirring blade and 3,000 rpm for a high-speed chopper, to thereby yield titanium oxide particles.

The titanium oxide particles were dried at 100° C. for 3 hours and were then calcined at 600° C., followed by sieving with a sieve having a mesh size of 1.19 mm and a sieve having a mesh size of 0.104 mm, to thereby yield granules each having a particle diameter of from 0.1 mm to 1.2 mm. The weight of the granules was defined as 100 wt %.

In the present invention, the phrase "granules each having a particle diameter of from 0.1 mm to 1.2 mm" refers to granules obtained by sieving granules by using a 15-mesh standard sieve made of stainless steel wire mesh (wire diameter: 0.5 mm, mesh size: 1.19 mm) and a 150-mesh standard sieve made of stainless steel wire mesh (wire diameter: 0.065 mm, mesh size: 0.104 mm), that is, granules passing through the 15-mesh standard sieve and remaining on the 150-mesh standard sieve.

Specifically, the granules each having a particle diameter of from 0.1 mm to 1.2 mm were obtained in the following manner. That is, the 15-mesh standard sieve was fixed to the upper lid of a Ro-Tap standard sieve shaker manufactured by Yoshida Seisakusho Co., Ltd. and the 150-mesh standard sieve was fixed to the lower tray of the sieve shaker. Then, 100 g of titanium oxide granules were supplied as a sample on the 15-mesh standard sieve, and were subjected to sieving for 3 minutes with shaking rotation at 300 rpm and the number of striking at 150 times/minute, to thereby yield granules passing through the 15-mesh standard sieve and remaining on the 150-mesh standard sieve as the granules each having a particle diameter of from 0.1 mm to 1.2 mm.

Finally, the granules were immersed into an aqueous solution containing varying concentrations of copper nitrate, followed by drying and then calcination at 500° C., to thereby yield titanium oxide granules having 1 wt % CuO, 3 wt % CuO, or 5 wt % CuO supported thereon. The amount of copper oxide supported was confirmed by means of fluorescent X-rays.

(2) Titanium Oxide Granules 2 Having Copper Oxide Supported thereon

Slurry A of titanium hydroxide obtained in the section (1) was heated at 100° C. and dried to produce a dried gel. The dried gel was calcined at 500° C. for 3 hours in an electrical furnace and was then subjected to grinding treatment to yield a ground product of Calcined titanium oxide D. 50 Parts by weight of the ground product of Calcined titanium oxide D and 50 parts by weight of the ground product of Calcined titanium oxide C were mixed.

The mixture of 50 parts by weight of the ground product of Calcined titanium oxide D and 50 parts by weight of the ground product of Calcined titanium oxide C was treated in the same manner as in the section (1). The resultant particles were dried, calcined, and sieved to yield granules each having a particle diameter of from 0.1 mm to 1.2 mm.

Finally, the granules were immersed into an aqueous solution containing varying concentrations of copper nitrate, followed by drying and then calcination at 500° C., to thereby yield titanium oxide granules having 1 wt % CuO, 3 wt % CuO, or 5 wt % CuO supported thereon. The amount of copper oxide supported was confirmed by means of fluorescent X-rays.

(3) Titanium Oxide Granules 3 Having Copper Oxide Supported Thereon

The titanium oxide granules obtained in the section (1) were further granulated so as to have a more spherical shape by spraying the ground product of Titanium oxide C and a 4-fold dilution of Sol B diluted with water by using a tumbling granulator "MARUMERIZER". The resultant particles were treated in the same manner as in the section (1) to yield granules each having a particle diameter of from 0.1 mm to 1.2 mm.

Finally, the granules were immersed into an aqueous solution containing varying concentrations of copper nitrate, followed by drying and then calcination at 500° C., to thereby yield titanium oxide granules having 1 wt % CuO, 3 wt % CuO, or 5 wt % CuO supported thereon. The amount of copper oxide supported was confirmed by means of fluorescent X-rays.

(4) Titanium Oxide Granules 4 Having Copper Oxide Supported Thereon

Sol B of titanium oxide obtained in the section (1) and ammonium tungstate were mixed. The mixture was heated at 100° C. and dried to produce a dried gel. The dried gel was calcined at 500° C. for 3 hours in an electrical furnace to yield a calcined titanium-tungsten composite oxide (weight ratio of titanium oxide to tungsten oxide: 90:10).

Calcined titanium-tungsten composite oxide E thus obtained was ground to produce a ground product. The ground product was granulated while a 5-fold dilution of Sol B diluted with water was being sprayed, by using a high-speed stirring granulator, model SPG-25, manufactured by Dalton Co., Ltd. under the conditions of 250 rpm for a stirring blade and 3,000 rpm for a high-speed chopper, to thereby yield titanium-tungsten composite oxide granules.

Next, the granules were further granulated so as to have a more spherical shape by spraying the ground product of Calcined titanium-tungsten composite oxide E and a 4-fold dilution of Sol B diluted with water by using a spheronizer "MARUMERIZER". The resultant granules were treated in the same manner as in the section (1) to yield granules each having a particle diameter of from 0.1 mm to 1.2 mm.

Finally, the granules were immersed into an aqueous solution containing varying concentrations of copper nitrate, followed by drying and then calcination at 500° C., to thereby yield titanium-tungsten composite oxide granules having 1 wt % CuO, 3 wt % CuO, or 5 wt % CuO supported thereon. The amount of copper oxide supported was confirmed by means of fluorescent X-rays.

It was confirmed that all the characteristics of the titanium oxide granules 1 to 4 having copper oxide supported thereon fell within the following ranges.

Specific surface area measured by a BET method: 30 m$^2$/g to 70 m$^2$/g

Pore volume measured by a mercury intrusion method: 0.20 cc/g to 0.60 cc/g

Tap density: 1.00 g/mL to 1.80 g/mL

Wear ratio: 2.0 wt % or less

Angle at which a granule first starts sliding: 0.5° to 15.0°

Angle at which all the granules finish sliding: 2.0° to 30.0°

Circularity: 1.00 to 2.00

Rest angle: 15° to 35°

Example 3

Recovery of Silica from Chaff Through Use of Titanium Oxide Granules

In this Example, silica was recovered from chaff. Further, the characteristics of the recovered silica were investigated.

The details of various conditions, an apparatus and samples used, and the like are as described below.

(Apparatus and Samples Used)

1. Experimental apparatus (reaction container): compact stirrer-type decomposition experimental apparatus {volume of reaction container: 2,380 ml (φ150 mm×135 mm in height)}
2. Chaff
3. Titanium oxide granules used: titanium oxide granules 1 of Example 1

(Recovery Conditions)

1. Amount of titanium oxide granules: 800 g
2. Reaction time: about 365 min
3. Supply air amount: 6 L/min, 8 L/min
4. Exhaust amount: 55 L/min (inverter setting: 30 Hz)
5. Lime pellet: 700 g
6. Reduction catalyst inlet temperature: 200° C.
7. Oxidation catalyst inlet temperature: 450° C.
8. Decomposition tank titanium temperature: 500° C., 530° C.
9. Decomposition tank stirring number: 10 rpm to 30 rpm (Recovery Method)

Chaff (350 g) was treated by being loaded at 0.8 g/50 sec into a compact stirring-type experimental apparatus (the temperature in its reaction container was 500° C. or 530° C.)

After the treatment, residues (titanium oxide catalyst+chaff ash) were recovered from the reaction container, and the titanium oxide catalyst and the chaff ash were separated from each other with a sieve (mesh size: 500 μm).

(Results of Recovery of Silica)

The recovery ratio of the chaff ash was from 14% to 22%. The content (wt %) of silica in chaff has been reported to be from about 16% to about 20%. That is, in the recovery method of the present invention, the chaff ash was able to be recovered with high efficiency as compared to that in the hitherto reported recovery method.

Further, the content of soluble silica in the chaff ash was analyzed (by the Japan Fertilizer and Feed Inspection Association). The content of soluble silica in the chaff ash after recovery treatment was 90.71%.

It has been reported that, in general, when combustion is performed in an existing furnace, only less than 10% of soluble silica can be recovered (see: http://www.jst.go.jp/tt/fair/ij2012/list/exhibitor_detail/ed10007.html).

Further, it has been reported that about 20% of soluble silica can be recovered through use of a commercially available biomass boiler and that about 50% of soluble silica can be recovered through use of an "air-blown fluidized-bed chaff incineration furnace" (see: http://sangakukan.jp/journal/journal_contents/2013/02/articles/1302-03-3/1302-03-3_article.html).

That is, in the recovery method of the present invention, soluble silica can be recovered with high efficiency as compared to that in the hitherto reported recovery method.

The chaff ash after recovery treatment was measured for its crystalline silica contents by X-ray diffraction {X' Pert MPD (PANalytical)}. Cristobalite and tridymite were not detected, the content of quartz was 0.1 wt % or less, and the content of crystalline silica was 0.2 wt % or less.

Thus, it was found that 98% (wt) or more of silica contained in the chaff ash after recovery treatment was amorphous silica. That is, in the recovery method of the present invention, amorphous silica (in particular, soluble silica) can be recovered at a high purity as compared to that in the hitherto reported recovery method.

Example 4

Recovery of Silica from Chaff Through Use of Titanium Oxide Granules Having Copper Oxide Supported Thereon In this Example, in the same manner as in Example 3, silica was recovered from chaff through use of titanium oxide granules having copper oxide supported thereon (titanium oxide granules 1 having copper oxide supported thereon of Example 2).

As in Example 3, silica was able to be recovered with a high recovery ratio.

Example 5

Recovery of Silica from Rice Straw

In this Example, in the same manner as in Example 3, silica was recovered from rice straw through use of titanium oxide granules.

As in Example 3, silica was able to be recovered with a high recovery ratio.

Overview

On the basis of the above-mentioned recovery results, the following may be said about the recovery method of the present invention.

(1) The purity of soluble silica is very high as compared to that in the hitherto reported recovery method.

(2) A high recovery ratio is achieved within a short period of time as compared to those in the hitherto reported recovery method.

(3) Little exhaust gas is generated along with recovery.

(4) Treatment can be performed at a low temperature of about 500° C. as compared to incineration treatment.

(5) No treatment with a strong acid or the like is required, resulting in less environmental burden.

(6) Treatment can be performed at ordinary pressure, thus eliminating a risk involved in high-pressure treatment.

(7) Treatment can be performed through utilization of heat of decomposition, and a surplus amount of heat can be reutilized for a boiler or the like.

By virtue of the foregoing, the recovery method of the present invention is very promising for effective utilization of a silica-containing plant body (in particular, chaff).

INDUSTRIAL APPLICABILITY

The recovery method of the present invention is very promising for effective utilization of a silica-containing plant body (in particular, chaff).

REFERENCE SIGNS LIST

201: sample container
202: stirrer
203: shaft
204: stirring blade

The invention claimed is:

1. A recovery method for silica, comprising bringing heated titanium oxide comprising titanium oxide granules into contact with a silica-containing plant body to obtain said silica, wherein the silica is 98% (wt) or more soluble silica and wherein the titanium oxide granules have the following characteristic (1) or (2):
   (1) a particle size distribution in the following range:
     titanium oxide granules each having a particle size of 1.2 mm or more account for from 1 wt % to 50 wt %;
     titanium oxide granules each having a particle size of from 0.5 mm to 1.2 mm account for from 40 wt % to 90 wt %; and
     titanium oxide granules each having a particle size of 0.5 mm or less account for from 1 wt % to 20 wt %; or
   (2) a particle size distribution in the following range:
     titanium oxide granules each having a particle size of 1.2 mm or more account for from 10 wt % to 60 wt %; and
     titanium oxide granules each having a particle size of from 0.5 mm to 1.2 mm account for from 40 wt % to 90 wt %.

2. A recovery method according to claim 1, wherein the silica-containing plant body is in the absence of any acid pre-treatment and comprises any one of chaff, unhulled rice, straw, and bran.

3. A recovery method according to claim 1, wherein the contact comprises stirring the silica-containing plant body together with the heated titanium oxide.

4. A recovery method according to claim 1, wherein a heating temperature of the titanium oxide falls within a range of from 300° C. to 700° C.

5. A recovery method according to claim 1, wherein the titanium oxide granules have the following characteristics:
   (1) the granules each have a substantially spherical shape; and
   (2) granules each having a particle diameter of from 0.2 mm to 1.2 mm account for 70% or more of all the granules.

6. A recovery method according to claim 5, wherein the characteristic "the granules each have a substantially spherical shape" comprises the following characteristics:
   (1) an angle at which a granule first starts rolling is from 0.5° to 15.0°; and
   (2) an angle at which all the granules finishes rolling is from 2.0° to 30.0°.

7. A recovery method according to claim 1, wherein the granules each have a specific surface area in a range of from 30 $m^2/g$ to 70 $m^2/g$.

8. A recovery method according to claim 1, wherein the granules each have a tap density in a range of from 1.00 g/mL to 1.80 g/mL.

9. A recovery method according to claim 1, wherein the granules each have a pore volume in a range of from 0.10 cc/g to 0.60 cc/g.

10. A recovery method according to claim 1, wherein the titanium oxide granules have the following characteristic:
    (1) the titanium oxide granules include titanium oxide granules obtained by drying a sol of titanium oxide to produce a titanium oxide gel, calcining the titanium oxide gel at a temperature in a range of from 450° C. to 850° C., and crushing the calcined product, followed by edge treatment, include particles each having a particle diameter of from 0.5 mm to 1.18 mm at a ratio in a range of from 50 wt % to 95 wt %, and each have a wear ratio of 2.0% or less.

11. A recovery method according to claim 1, wherein the titanium oxide granules have copper oxide or copper supported thereon.

12. A recovery method according to claim 11, wherein an amount of the copper oxide to be supported is from 0.5 wt % to 5.0 wt % in terms of copper oxide.

13. The recovery method according to claim 1, further comprising separating the silica from the heated titanium oxide with a sieve.

* * * * *